US012808817B2

(12) United States Patent
Hayashi et al.

(10) Patent No.: US 12,808,817 B2
(45) Date of Patent: Nov. 24, 2026

(54) FOREIGN SUBSTANCE DETECTION DEVICE AND FOREIGN SUBSTANCE DETECTION METHOD

(71) Applicant: Tokyo Electron Limited, Tokyo (JP)

(72) Inventors: Masato Hayashi, Koshi City (JP); Koudai Higashi, Koshi City (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 138 days.

(21) Appl. No.: 18/724,335

(22) PCT Filed: Dec. 13, 2022

(86) PCT No.: PCT/JP2022/045915

§ 371 (c)(1),
(2) Date: Jun. 26, 2024

(87) PCT Pub. No.: WO2023/127488

PCT Pub. Date: Jul. 6, 2023

(65) Prior Publication Data

US 2025/0093276 A1 Mar. 20, 2025

(30) Foreign Application Priority Data

Dec. 27, 2021 (JP) ................................ 2021-212603

(51) Int. Cl.
*G01N 21/94* (2006.01)
*G01N 21/85* (2006.01)

(52) U.S. Cl.
CPC ............ *G01N 21/94* (2013.01); *G01N 21/85* (2013.01); *G01N 2201/0691* (2013.01)

(58) Field of Classification Search
CPC .... G01N 21/94; G01N 21/85; G01N 21/8806; G01N 2201/0691
See application file for complete search history.

(56) References Cited

U.S. PATENT DOCUMENTS

2005/0007580 A1* 1/2005 MacGibbon .......... G01N 21/94 356/237.2
2018/0128733 A1* 5/2018 Goradia ........... B01L 3/502715

FOREIGN PATENT DOCUMENTS

JP H01-321324 A 12/1989
JP 2020-119996 A 8/2020

(Continued)

OTHER PUBLICATIONS

International Search Report for PCT/JP2022/045915 dated Feb. 21, 2023.

*Primary Examiner* — Kara E. Geisel
*Assistant Examiner* — Christina I Xing
(74) *Attorney, Agent, or Firm* — Chrisman Gallo Tochtrop LLC

(57) ABSTRACT

A foreign substance detection device configured to detect a foreign substance contained in a processing liquid configured to process a substrate includes multiple processing liquid flow path forming mechanisms configured to form multiple processing liquid flow paths through which the processing liquid to be supplied to the substrate flows; a radiator configured to radiate radiation light from a light source toward each of the multiple processing liquid flow paths; and a light receiver configured to receive light emitted from the processing liquid flow paths by radiating the radiation light. The radiator includes a light adjuster configured to adjust a light amount of the radiation light radiated to the multiple processing liquid flow paths.

6 Claims, 14 Drawing Sheets

(56) References Cited

FOREIGN PATENT DOCUMENTS

| | | | | | |
|---|---|---|---|---|---|
| WO | WO-2013140617 | A1 * | 9/2013 | ............. | G01N 21/05 |
| WO | WO-2020071273 | A1 * | 4/2020 | ............. | G01N 15/06 |
| WO | WO-2021182117 | A1 * | 9/2021 | ............. | G01N 21/53 |

* cited by examiner

FOREIGN SUBSTANCE DETECTION DEVICE AND FOREIGN SUBSTANCE DETECTION METHOD

CROSS-REFERENCE TO RELATED APPLICATIONS

This Application is a U.S. national phase application under 35 U.S.C. § 371 of PCT Application No. PCT/JP2022/045915 filed on Dec. 13, 2022, which claims the benefit of Japanese Patent Application No. 2021-212603 filed on Dec. 27, 2021, the entire disclosures of which are incorporated herein by reference.

TECHNICAL FIELD

The various aspects and embodiments described herein pertain generally to a foreign substance detection device and a foreign substance detection method.

BACKGROUND

Patent Document 1 describes a substrate processing apparatus that optically detects a foreign substance in a supply path through which a fluid to be supplied to a substrate flows. This substrate processing apparatus adopts a method of transmitting light to a flow path forming member through which the fluid flows, receiving light generated as a result from the flow path forming member, and detecting a foreign substance based on the intensity of the received light.

Patent Document 1: Japanese Patent Laid-open Publication No. 2020-119996

SUMMARY

In an exemplary embodiment, a foreign substance detection device configured to detect a foreign substance contained in a processing liquid configured to process a substrate includes multiple processing liquid flow path forming mechanisms configured to form multiple processing liquid flow paths through which the processing liquid to be supplied to the substrate flows; a radiator configured to radiate radiation light from a light source toward each of the multiple processing liquid flow paths; and a light receiver configured to receive light emitted from the processing liquid flow paths by radiating the radiation light. The radiator includes a light adjuster configured to adjust a light amount of the radiation light radiated to the multiple processing liquid flow paths.

DETAILED DESCRIPTION

Figure 1:
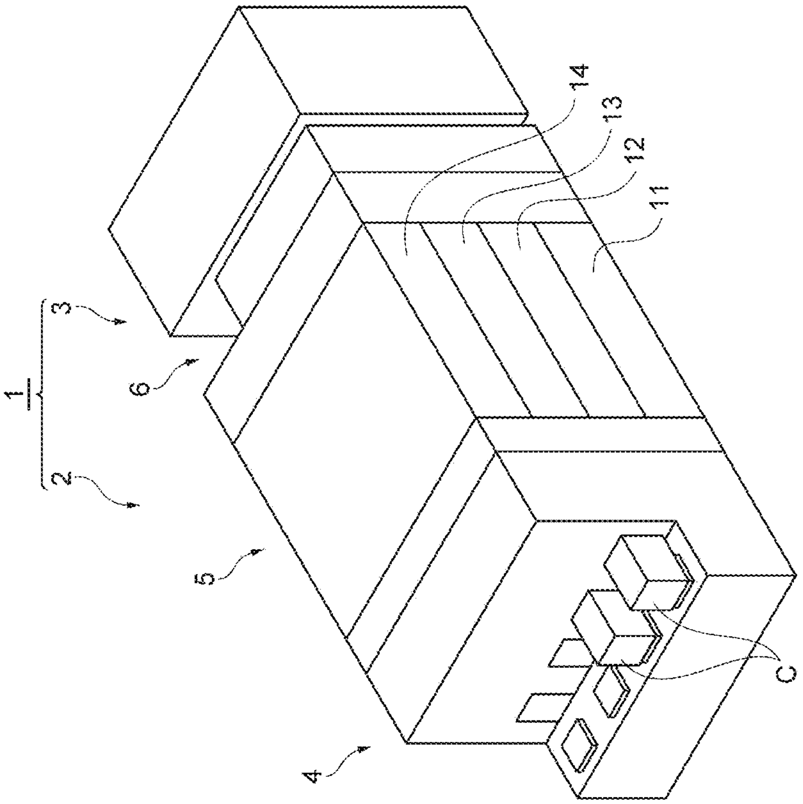
FIG. 1 is a schematic perspective view illustrating an example of a substrate processing system.

Hereinafter, various exemplary embodiments will be described with reference to the accompanying drawings.

According to one exemplary embodiment, a foreign substance detection device is provided. The foreign substance detection device configured to detect a foreign substance contained in a processing liquid configured to process a substrate includes multiple processing liquid flow path forming mechanisms each forming a processing liquid flow path through which the processing liquid to be supplied to the substrate flows; a radiator configured to radiate radiation light from a light source toward each of the multiple processing liquid flow paths; and a light receiver configured to receive light emitted from the processing liquid flow path by radiating the radiation light. The radiator includes a light adjuster configured to adjust a light amount of the radiation light radiated to the multiple processing liquid flow paths.

According to this foreign substance detection device, the light emitted from the light source is radiated to the processing liquid flow path after the light amount is adjusted by the light adjuster included in the radiator. At this time, when processing liquids with different characteristics flow through a plurality of processing liquid flow paths, or when flow path conditions such as a flow speed and a flow rate are different, the amount of the light to be radiated to those processing liquid flow paths can be adjusted, so that efficient foreign substance detection can be carried out according to the state of the processing liquid in each processing liquid flow path. In addition, even when the type or characteristics of the target liquid in the plurality of processing liquid flow paths are the same, the light amount is adjusted to establish multiple standards for the foreign substance detection or to monitor the level of the noise, and so forth.

The radiator may be moved relative to the multiple processing liquid flow paths to radiate the radiation light toward each of the multiple processing liquid flow paths, and the light adjuster may be provided on an optical path toward each of the multiple processing liquid flow paths. In this case, since it becomes possible to respectively adjust the light amount for each of the processing liquid flow paths, it becomes possible to adjust the light amount in a flexible manner.

Under a condition that intensity of a haze noise component, which fluctuates according to intensity of the radiation light, does not fall below intensity of a steady noise component, among noise components included in light received by the light receiver when the radiation light is radiated to one of the multiple processing liquid flow paths, that occurs regardless of the intensity of the radiation light, the light adjuster may adjust the light amount of the radiation light to be radiated to the one processing liquid flow path such that the intensity of the haze noise component becomes close to the intensity of the steady noise component. Among the noise components included in the light received by the light receiver, the haze noise component is a component that fluctuates depending on the intensity of the radiation light. For this reason, by adjusting the intensity of the radiation light to be close to the intensity of the steady noise component, the intensity of the radiation light can be adjusted to be small while suppressing the decrease in the precision of the foreign substance detection.

The foreign substance detection device may further include a controller configured to acquire an electric signal according to the intensity of the light received by the light receiver. The controller may estimate the intensity of the steady noise component and the intensity of the haze noise component based on the electric signal corresponding to the light received by the light receiver when the radiation light is radiated to the one processing liquid flow path, and the light adjuster may adjust the light amount of the radiation light to be radiated to the one processing liquid flow path based on an estimation result in the controller such that the intensity of the haze noise component, which fluctuates according to the intensity of the radiation light, becomes close to the intensity of the steady noise component. With the above configuration, the intensity of the steady noise component and the intensity of the haze noise component are estimated based on the electrical signal corresponding to the light received by the light receiver, and the amount of the radiation light is adjusted based on this result. Therefore, the intensity of the radiation light can be adjusted with higher precision.

The controller may estimate the intensity of the steady noise component and the intensity of the haze noise component from the electric signal corresponding to the light received by the light receiver when different light amounts of the radiation light are radiated to the one processing liquid flow path. The intensity of the haze noise component can fluctuate depending on the intensity of the radiation light, so when different amounts of radiation light are radiated as in the above configuration, the intensity of the steady noise component and the intensity the haze are estimated based on the difference in the light received by the light receiver. By adopting this configuration, it becomes possible to more accurately estimate the relationship between the haze noise component and the steady noise component.

According to another exemplary embodiment, a foreign substance detection method is provided. The foreign substance detection method in a foreign substance detection device configured to detect a foreign substance contained in a processing liquid configured to process a substrate includes radiating, by a radiator, radiation light from a light source toward multiple processing liquid flow paths through which the processing liquid to be supplied to the substrate flows; and receiving, by a light receiver, light emitted from the processing liquid flow paths by radiating the radiation light. The radiator varies, by a light adjuster, a light amount of the radiation light to be radiated to the multiple processing liquid flow paths.

According to the above-described foreign substance detection method, the light emitted from the light source is radiated to the processing liquid flow path after the light amount thereof is adjusted by the light adjuster included in the radiator. At this time, when the processing liquids with the different characteristics flow through the plurality of processing liquid flow paths, or when the flow path conditions such as a flow speed and a flow rate are different, the amount of the light radiated to the plurality of processing liquid flow paths can be adjusted. Therefore, the efficient foreign substance detection can be performed according to the state of the processing liquid in each processing liquid flow path.

Hereinafter, an exemplary embodiment will be described with reference to the accompanying drawings. In the description, same parts or parts having same functions will be assigned same reference numerals, and redundant description thereof will be omitted. In some of the drawings, there may be used a rectangular coordinate system defined by the X-axis, the Y-axis and the Z-axis. In the following description, the Z-axis corresponds to a vertical direction, and the X-axis and the Y-axis correspond to horizontal directions.

[Substrate Processing System]

A substrate processing system 1 (substrate processing apparatus) shown in FIG. 1 is a system configured to perform, on a workpiece W, formation of a photosensitive film, exposure of the photosensitive film, and development of the photosensitive film. The workpiece W as a processing target is, for example, a substrate or a substrate on which a film, a circuit, or the like has been formed by being subjected to a predetermined processing. The substrate included in the workpiece W is, for example, a wafer containing silicon. The workpiece W (substrate) may be formed in a circular shape. The workpiece W as the processing target may be a glass substrate, a mask substrate, a flat panel display (FPD), or the like, or may be an intermediate body obtained by performing a predetermined processing on these substrates. The photosensitive film is, for example, a resist film.

The substrate processing system 1 includes a coating and developing apparatus 2 and an exposure apparatus 3. The exposure apparatus 3 is configured to perform an exposure processing on the resist film (photosensitive film) formed on the workpiece W (substrate). Specifically, the exposure apparatus 3 radiates an energy ray to an exposure target portion of the resist film by such a method as liquid immersion exposure. The coating and developing apparatus 2 is configured to perform a processing of forming the resist film on a surface of the workpiece W before the exposure processing by the exposure apparatus 3, and is also configured to perform a developing processing on the resist film after the exposure processing.

(Substrate Processing Apparatus)

Figure 2:
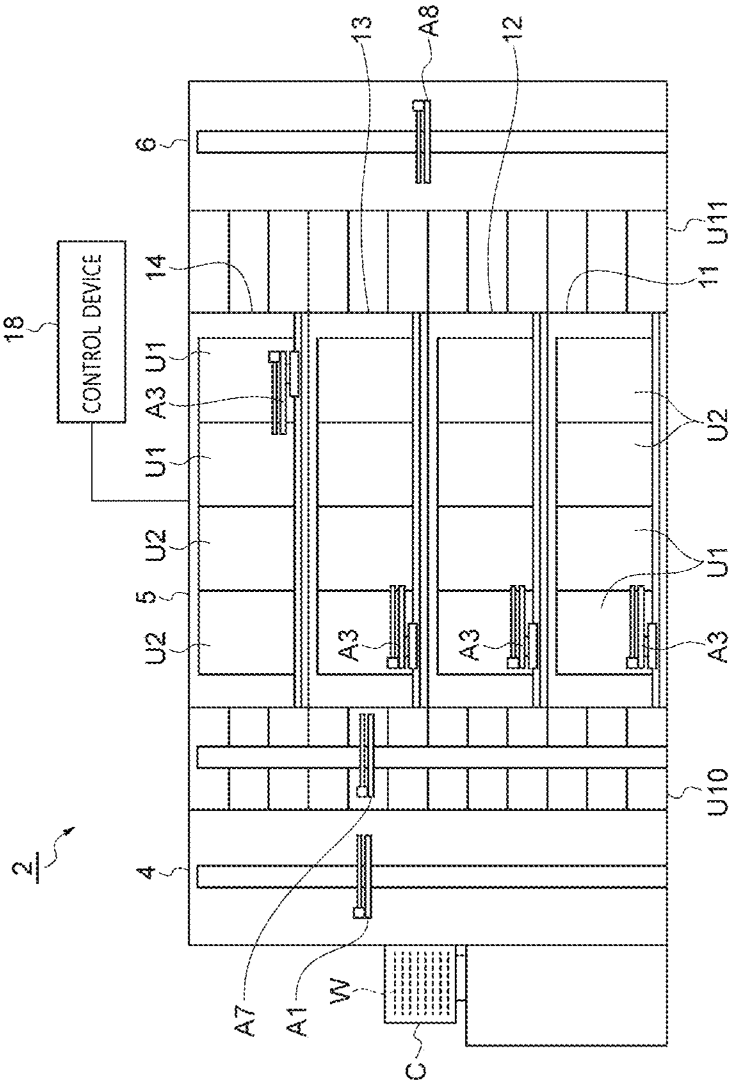
FIG. 2 is a schematic diagram illustrating an example of a coating and developing apparatus.

Hereinafter, a configuration of the coating and developing apparatus 2 will be described as an example of the substrate processing apparatus. As shown in FIG. 1 and FIG. 2, the coating and developing apparatus 2 includes a carrier block 4, a processing block 5, an interface block 6, and a control device 18.

The carrier block 4 is configured to perform a carry-in and a carry-out of the workpiece W into/from the coating and developing apparatus 2. For example, the carrier block 4 is configured to support a plurality of carriers C for the workpiece W, and has therein a transfer device A1 including a delivery arm. Each carrier C accommodates therein, for example, a plurality of circular workpieces W. The transfer device A1 is configured to take out the workpiece W from the carrier C, hand the workpiece W over to the processing block 5, receive the workpiece W from the processing block 5, and return the workpiece W back into the carrier C. The processing block 5 has a plurality of processing modules 11, 12, 13, and 14.

The processing module 11 incorporates therein a liquid processing device U1, a heat treatment device U2, and a transfer device A3 configured to transfer the workpiece W to these devices. The processing module 11 is configured to form a bottom film on the surface of the workpiece W by the liquid processing device U1 and the heat treatment device U2. The liquid processing device U1 is configured to coat a processing liquid for forming the bottom film on the workpiece W. The heat treatment device U2 is configured to perform various kinds of heat treatments required to form the bottom film.

The processing module 12 incorporates therein a liquid processing device U1, a heat treatment device U2, and a transfer device A3 configured to transfer the workpiece W to these devices. The processing module 12 is configured to form a resist film on the bottom film by the liquid processing device U1 and the heat treatment device U2. The liquid processing device U1 is configured to coat, on the bottom film, a processing liquid (resist) for forming the resist film. The heat treatment device U2 is configured to perform various kinds of heat treatments required to form the resist film.

The processing module 13 incorporates therein a liquid processing device U1, a heat treatment device U2, and a transfer device A3 configured to transfer the workpiece W to these devices. The processing module 13 is configured to form a top film on the resist film by the liquid processing device U1 and the heat treatment device U2. The liquid processing device U1 is configured to coat, on the resist film, a liquid for forming the top film. The heat treatment device U2 is configured to perform various kinds of heat treatments required to form the top film.

The processing module 14 incorporates therein a liquid processing device U1, a heat treatment device U2, and a transfer device A3 configured to transfer the workpiece W to these devices. The processing module 14 is configured to perform a developing processing on the exposed resist film and a heat treatment required for the developing processing by the liquid processing device U1 and the heat treatment device U2. The liquid processing device U1 is configured to perform the developing processing on the resist film by coating a developing liquid on the surface of the workpiece W after being subjected to the exposure processing and then by washing away the developing liquid with a rinse liquid. The heat treatment device U2 is configured to perform various kinds of heat treatments required for the developing processing. Specific examples of these heat treatments include a heat treatment before development (PEB: Post Exposure Bake), a heat treatment after development (PB: Post Bake), etc.

Within the processing block 5, a shelf U10 is provided near the carrier block 4. The shelf U10 is partitioned into a multiple number of cells arranged in a vertical direction. A transfer device A7 including an elevating arm is provided near the shelf U10. The transfer device A7 is configured to move the workpiece W up and down between the cells of the shelf U10.

Within the processing block 5, a shelf U11 is provided near the interface block 6. The shelf U11 is partitioned into a multiple number of cells arranged in the vertical direction.

The interface block 6 is configured to deliver the workpiece W to/from the exposure apparatus 3. By way of example, the interface block 6 incorporates therein a transfer device A8 including a delivery arm, and is connected to the exposure apparatus 3. The transfer device A8 is configured to hand the workpiece W placed in the shelf U11 over to the exposure apparatus 3, receive the workpiece W from the exposure apparatus 3, and return the workpiece W back into the shelf U11.

The control device 18 controls the coating and developing apparatus 2 to perform a coating and developing processing in the following sequence, for example. First, the control device 18 controls the transfer device A1 to transfer the workpiece W within the carrier C into the shelf U10, and controls the transfer device A7 to place this workpiece W in the cell for the processing module 11.

Subsequently, the control device 18 controls the transfer device A3 to transfer the workpiece W of the shelf U10 to the liquid processing device U1 and the heat treatment device U2 within the processing module 11. Further, the control device 18 controls the liquid processing device U1 and the heat treatment device U2 to form the bottom film on the surface of the workpiece W. Thereafter, the control device 18 controls the transfer device A3 to return the workpiece W having the bottom film formed thereon into the shelf U10, and controls the transfer device A7 to place this workpiece W in the cell for the processing module 12.

Next, the control device 18 controls the transfer device A3 to transfer the workpiece W of the shelf U10 to the liquid processing device U1 and the heat treatment device U2 within the processing module 12. Further, the control device 18 controls the liquid processing device U1 and the heat treatment device U2 to form the resist film on the surface of the workpiece W. Thereafter, the control device 18 controls the transfer device A3 to return the workpiece W to the shelf U10, and controls the transfer device A7 to place this workpiece W in the cell for the processing module 13.

Subsequently, the control device 18 controls the transfer device A3 to transfer the workpiece W of the shelf U10 to the individual devices within the processing module 13. Further, the control device 18 controls the liquid processing device U1 and the heat treatment device U2 to form the top film on the resist film of the workpiece W. Afterwards, the control device 18 controls the transfer device A3 to transfer the workpiece W to the shelf U11.

Next, the control device 18 controls the transfer device A8 to send the workpiece W of the shelf U11 to the exposure apparatus 3. Thereafter, the control device 18 controls the transfer device A8 to receive the workpiece W after being subjected to the exposure processing from the exposure apparatus 3 and place the received workpiece W in the cell for the processing module 14 in the shelf U11.

Then, the control device 18 controls the transfer device A3 to transfer the workpiece W of the shelf U11 to the individual devices in the processing module 14, and controls the liquid processing device U1 and the heat treatment device U2 to perform the developing processing on the resist film of the workpiece W. Thereafter, the control device 18 controls the transfer device A3 to return the workpiece W to the shelf U10, and controls the transfer device A7 and the transfer device A1 to return the workpiece W back into the carrier C. Through these operations, the coating and developing processing is completed.

(Liquid Processing Device)

Figure 3:
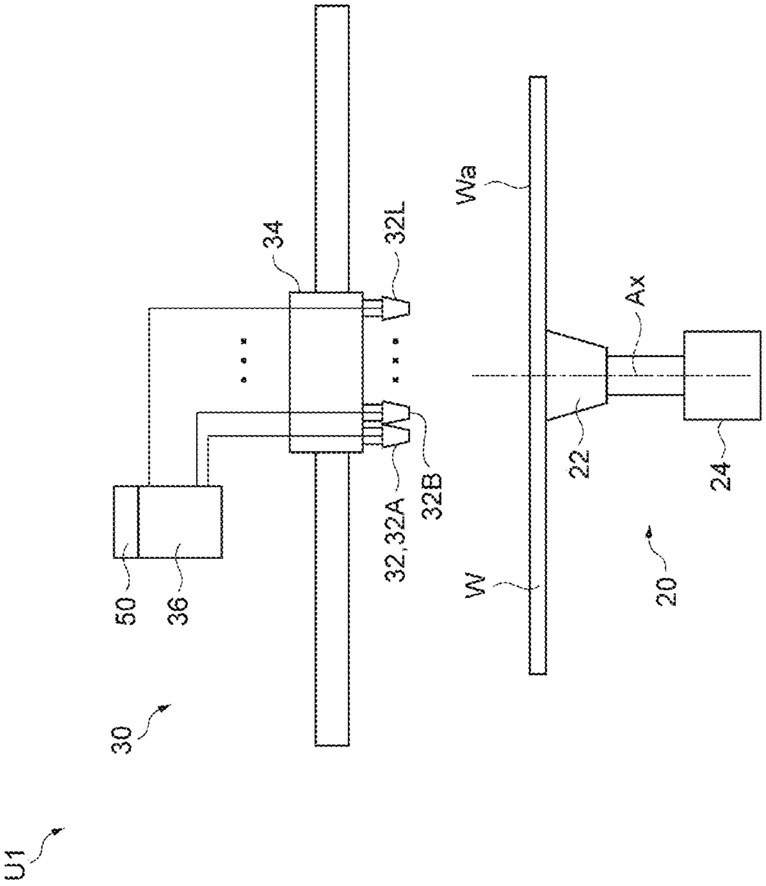
FIG. 3 is a schematic diagram illustrating an example of a liquid processing device.

Now, an example of the liquid processing device U1 will be described in detail with reference to FIG. 3 and FIG. 4. Here, the liquid processing device U1 (processing liquid supply device) in the processing module 12 configured to form the resist film will be explained as an example. The liquid processing device U1 includes, as depicted in FIG. 3, a rotating holder 20 and a processing liquid supply 30.

The rotating holder 20 is configured to hold and rotate the workpiece W based on an operation instruction from the control device 18. By way of example, the rotating holder 20 is equipped with a holder 22 and a rotation driver 24. The holder 22 is configured to support a central portion of the workpiece W, which is horizontally placed thereon with the surface Wa facing upwards, and is configured to hold the workpiece W by, for example, vacuum attraction. The rotation driver 24 is an actuator including a power source such as, but not limited to an electric motor, and is configured to rotate the holder 22 around a vertical axis Ax1. Accordingly, the workpiece W on the holder 22 is also rotated.

The processing liquid supply 30 is configured to discharge a processing liquid toward the surface Wa of the workpiece W based on an operation instruction from the control device 18, to supply the processing liquid onto the surface Wa. The processing liquid supplied by the processing liquid supply 30 is a substrate processing solution used to process the workpiece W. As an example, the processing liquid may be a solution (resist) used for forming the resist film and a solution (for example, thinner) used in a pre-wet processing for improving the wettability of the surface Wa with respect to the resist. The processing liquid supply 30 includes, for example, a plurality of nozzles 32, a holding head 34, and a supply 36.

The plurality of nozzles 32 individually discharge the processing liquids onto the surface Wa of the workpiece W held by the holder 22. The plurality of nozzles 32 are disposed above the workpiece W, for example, while being held by the holding head 34, and individually discharge the processing liquids downwards. The holding head 34 may be configured to be movable in a direction along the surface Wa of the workpiece W by a non-illustrated driver. Although the number of the plurality of nozzles 32 is not particularly limited, the following description will be provided for an example where the processing liquid supply 30 has twelve nozzles 32 (hereinafter, referred to as "nozzles 32A to 32L").

The processing liquid is supplied from the supply 36 to each of the nozzles 32A to 32L. Different types of processing liquids may be supplied to the nozzles 32A to 32L from the supply 36. As an example, different types of resist are supplied to the nozzles 32A to 32J from the supply 36, and different types of thinner are supplied to the nozzles 32K and 32L from the supply 36.

Figure 4:
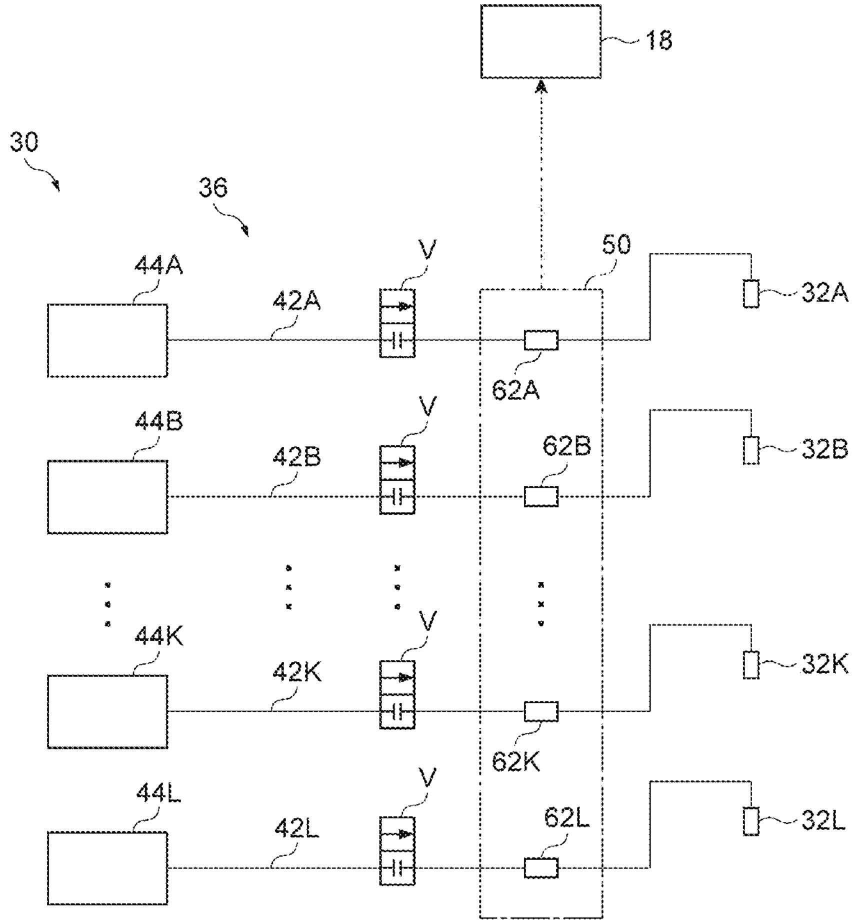
FIG. 4 is a schematic diagram illustrating an example of a processing liquid supply of the liquid processing device.

As shown in FIG. 4, the supply 36 includes a plurality of supply lines 42A to 42L and a plurality of supply sources 44A to 44L. The supply line 42A forms a flow path between the nozzle 32A and the supply source 44A, which is a liquid source of the processing liquid supplied to the nozzle 32A (that is, discharged from the nozzle 32A). The supply source 44A includes, for example, a bottle in which the processing liquid is stored, and a pump configured to force-feed the processing liquid from the bottle toward the nozzle 32A. Like this supply line 42A, the supply lines 42B to 42L forms flow paths between the supply sources 44B to 44L, which are liquid sources of the processing liquids, and the nozzles 32B to 32L, respectively.

The supply 36 further includes a plurality of opening/closing valves V provided in the plurality of supply lines 42A to 42L, respectively. The opening/closing valve V is switched into an open state or closed state based on an operation instruction from the control device 18. As the opening/closing state of the plurality of opening/closing valves V are switched, the flow paths of the supply lines 42A to 42L are opened or closed, respectively. For example, when the opening/closing valves V are turned into the open state, the processing liquids flow through the flow paths of the supply lines 42A to 42L, and are discharged from the nozzles 32A to 32L toward the surface Wa of the workpiece W.

(Foreign Substance Detection Device)

The coating and developing apparatus 2 is further equipped with a foreign substance detection device 50 (foreign substance detector) configured to detect a foreign substance (particle) contained in the processing liquid supplied to the workpiece W. The foreign substance detection device 50 is configured to detect a foreign substance in the processing liquid flowing through the flow path of each of the plurality of supply lines 42A to 42L, for example. The foreign substance detection device 50 may be disposed near the liquid processing device U1, or may be disposed within a housing of the liquid processing device U1. Some components of the foreign substance detection device 50 may be provided between the opening/closing valves V on the flow paths of the supply lines 42A to 42L and the nozzles 32A to 32L. Below, an example of the foreign substance detection device 50 will be described with reference to FIG. 5 to FIG. 11.

Figure 5:
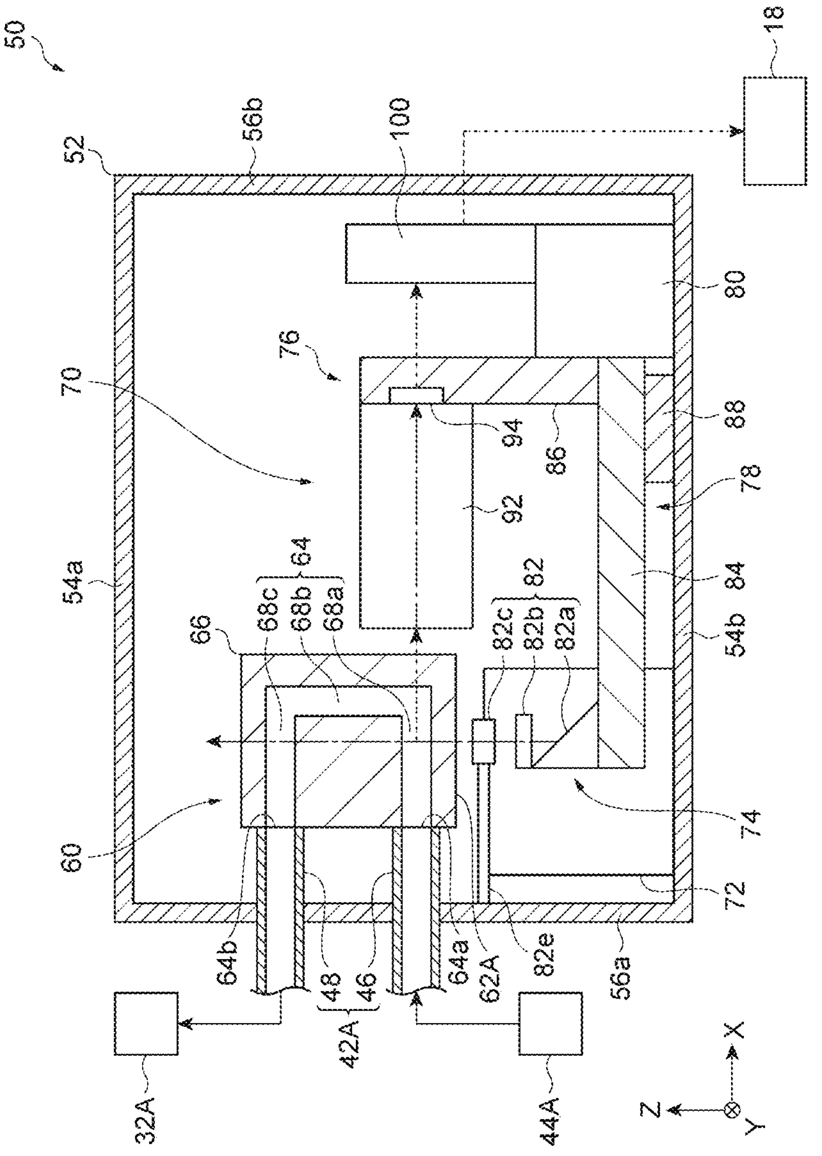
FIG. 5 is a side view schematically illustrating an example of a foreign substance detection module.

The foreign substance detection device 50 forms a flow path (hereinafter, referred to as "processing liquid flow path") through which the processing liquids flowing in the supply lines 42A to 42L flow. The foreign substance detection device 50 is configured to radiate radiation light (for example, laser light) to the processing liquid flow path and receive light generated in the processing liquid flow path to thereby detect the foreign substance containing in the processing liquid flowing through the processing liquid flow path. As shown in FIG. 5, the foreign substance detection device 50 includes, for example, a housing 52, a flow path forming mechanism 60, and a measurer 70. The housing 52 includes a ceiling wall 54*a*, a bottom wall 54*b*, and sidewalls 56*a* to 56*d*. As an example, the ceiling wall 54*a* and the bottom wall 54*b* are disposed horizontally (along the X-Y plane). Further, the sidewalls 56*a* and 56*b* are disposed vertically along the Y-axis direction (along the Y-Z plane), and face each other in the X-axis direction (first direction). Furthermore, the sidewalls 56*c* and 56*d* are disposed vertically along the X-axis direction (along the X-Z plane), and face each other in the Y-axis direction (second direction). The housing 52 accommodates therein the flow path forming mechanism 60 and the measuring portion 70.

Figure 6:
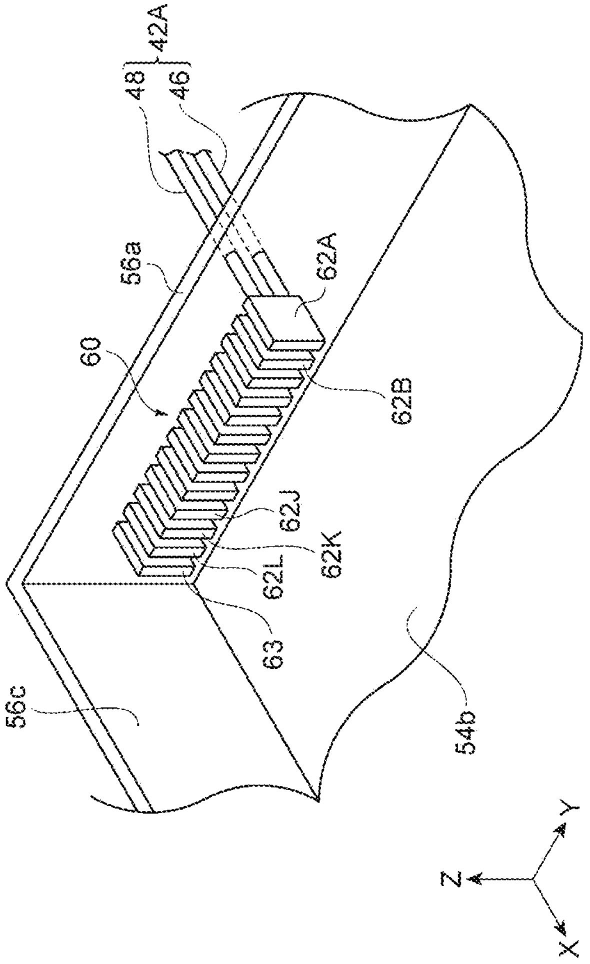
FIG. 6 is a perspective view schematically illustrating the example of the foreign substance detection module.

The flow path forming mechanism 60 forms a plurality of processing liquid flow paths respectively provided on the flow paths of the supply lines 42A to 42L. Each of the plurality of processing liquid flow paths formed by the flow path forming mechanism 60 is used to detect the foreign substance contained in the processing liquid flowing therein. For example, the flow path forming mechanism 60 has, as shown in FIG. 6, a plurality of processing liquid flow path forming mechanisms 62A to 62L. The plurality of processing liquid flow path forming mechanisms 62A to 62L have the same configuration. Below, details of the processing liquid flow path forming mechanism 62A will be described as an example.

As shown in FIG. 5, the processing liquid flow path forming mechanism 62A forms a processing liquid flow path 64 on the flow path of the supply line 42A that connects the supply source 44A to the nozzle 32A (see FIG. 4). Upstream and downstream ends of the processing liquid flow path 64 are connected to the supply line 42A. Accordingly, the processing liquid force-fed from the supply source 44A passes through a part of the flow path of the supply line 42A, the processing liquid flow path 64 of the processing liquid flow path forming mechanism 62A, and the remaining part of the flow path of the supply line 42A in this sequence, and is then discharged from the nozzle 32A onto the surface Wa of the workpiece W.

The processing liquid flow path forming mechanism 62A includes, for example, a block body 66 in which the processing liquid flow path 64 is formed. The block body 66 is made of a material that can transmit the laser light that is used when detecting the foreign substance. The material forming the block body 66 may be, by way of example, quartz and sapphire. The block body 66 may be formed in a rectangular parallelepiped shape, and one side of the block body 66 may face the sidewall 56*a*. As an example, an inlet 64*a* and an outlet 64*b* of the processing liquid flow path 64 are formed on the side of the block body 66 that faces the sidewall 56*a*. The inlet 64*a* may be located below the outlet 64*b*.

The processing liquid flow path 64 includes, for example, a first flow path 68*a*, a second flow path 68*b*, and a third flow path 68*c*. The first flow path 68*a* is formed to extend in the horizontal direction (along the X-axis direction in the drawing) along the bottom wall 54*b*. One end of the first flow path 68*a* close to the sidewall 56*a* constitutes the inlet 64*a*, and the other end of the first flow path 68*a* close to the sidewall 56*b* is connected to the second flow path 68*b*. The second flow path 68*b* is formed to extend along the sidewall 56*a* (along the Z-axis direction) in the vertical direction. One end of the second flow path 68*b* close to the bottom wall 54*b* is connected to the first flow path 68*a*, and the other end of the second flow path 68*b* close to the ceiling wall 54*a* is connected to the third flow path 68*c*. The third flow path 68*c* is formed to extend in the horizontal direction (along the X-axis direction) along the bottom wall 54*b*. One end of the third flow path 68*c* close to the sidewall 56*b* is connected to the second flow path 68*b*, and the other end of the third flow path 68*c* close to the sidewall 56*a* constitutes the outlet 64*b*.

A portion of the supply line 42A upstream of the processing liquid flow path forming mechanism 62A (hereinafter, this portion will be referred to as "upstream supply line 46") is connected to the inlet 64*a*. A portion of the supply line 42A downstream of the processing liquid flow path forming mechanism 62A (hereinafter, this portion will be referred to as "downstream supply line 48") is connected to the outlet 64*b*. The upstream supply line 46 and the downstream supply line 48 penetrate the sidewall 56*a* facing the block body 66. With the above-described configuration, the processing liquid sent from the supply source 44A passes through the upstream supply line 46, the first flow path 68*a*, the second flow path 68*b*, the third flow path 68*c*, and the downstream supply line 48 in this order to be finally supplied to the workpiece W from the nozzle 32A.

As described above, the processing liquid flow path forming mechanisms 62A to 62L shown in FIG. 6 have the same configuration. That is, like the processing liquid flow path forming mechanism 62A, each of the processing liquid flow path forming mechanisms 62B to 62L includes the block body 66 in which the processing liquid flow path 64 is formed. The processing liquid flow path 64 of each of the processing liquid flow path forming mechanisms 62B to 62L includes the first flow path 68*a*, the second flow path 68*b*, and the third flow path 68*c*. The upstream supply lines 46 of the supply lines 42B to 42L are respectively connected to the inlets 64*a* (first flow paths 68*a*) of the processing liquid flow path forming mechanisms 62B to 62L. The downstream supply lines 48 of the supply lines 42B to 42L are respectively connected to the outlets 64*b* (third flow paths 68*c*) of the processing liquid flow path forming mechanisms 62B to 62L.

The processing liquid flow path forming mechanisms 62A to 62L are arranged side by side along a direction from the sidewall 56*d* toward the sidewall 56*c* (along the Y-axis direction), while facing the sidewall 56*a*. The processing liquid flow path forming mechanisms 62A to 62L may be arranged in this order with gaps therebetween. Height positions (positions in the Z-axis direction) of the first flow paths 68*a* of the processing liquid flow path forming mechanisms 62A to 62L may be substantially the same.

Distances (positions in the X-axis direction) of the second flow path 68*b* of the processing liquid flow path forming mechanisms 62A to 62L from the sidewall 56*a* are substantially equal. Further, height positions (distances from the bottom wall 54*b*) of the third flow paths 68*c* of the processing liquid flow path forming mechanisms 62A to 62L may also be substantially equal.

The first flow paths 68*a* of the processing liquid flow path forming mechanisms 62A to 62L are arranged side by side along the Y-axis direction. The second flow paths 68*b* of the processing liquid flow path forming mechanisms 62A to 62L are arranged side by side along the Y-axis direction. The third flow paths 68*c* of the processing liquid flow path forming mechanisms 62A to 62L are arranged side by side along the Y-axis direction.

Figure 7:
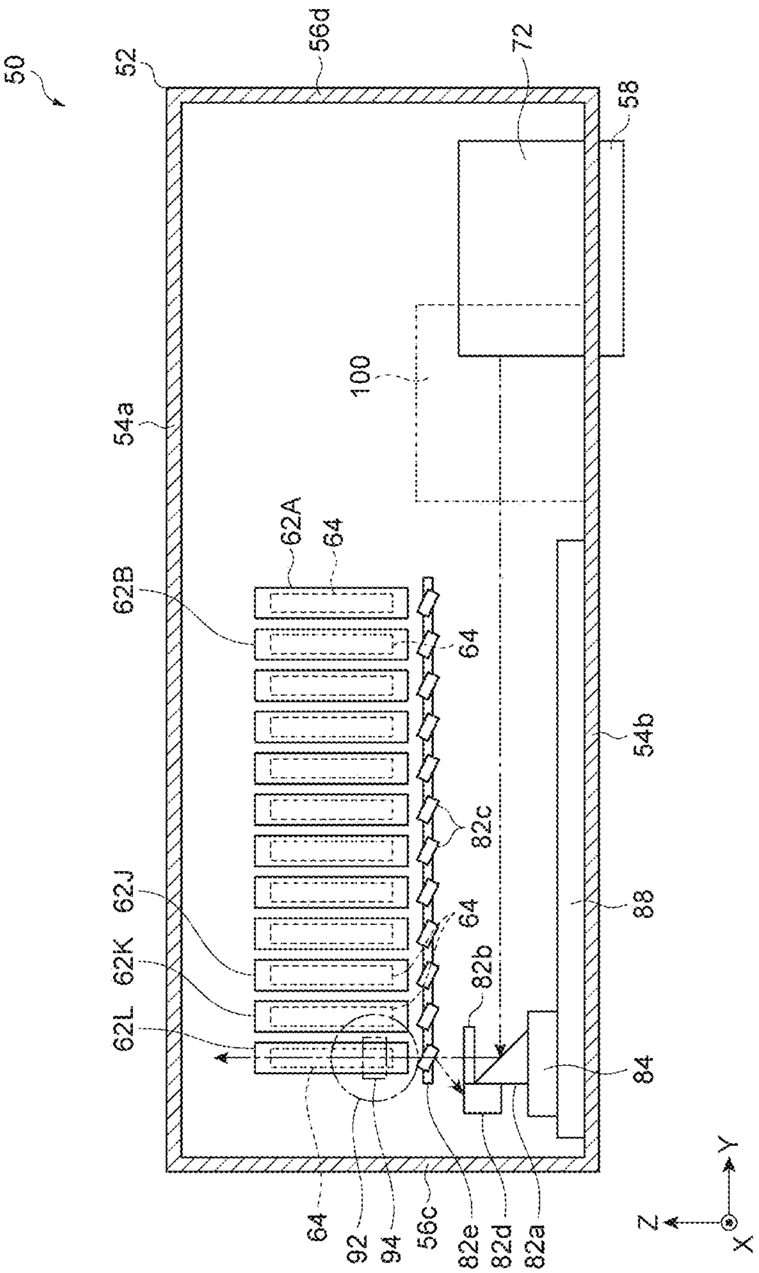
FIG. 7 is a side view schematically illustrating the example of the foreign substance detection module.

Referring back to FIG. 5, the measurer 70 has a light source 72, a radiator 74, a light receiver 76, a holder 78, and a driver 80. The light source 72 is configured to generate laser light as radiation light for detecting the foreign substance in the processing liquid. The light source 72 emits laser light having a wavelength of, e.g., approximately 400 nm to 1000 nm and an output of, e.g., approximately 600 mW to 1000 mW. By way of example, as shown in FIG. 7, the light source 72 is provided on the bottom wall 54*b* and positioned below the processing liquid flow path forming mechanisms 62A to 62L. As an example, the light source 72 emits the laser light in a direction from the sidewall 56*d* toward the sidewall 56*c* (negative Y-axis direction). The light source 72 is disposed at a different position from the processing liquid flow path forming mechanism 62A in the Y-axis direction. The light source 72 is spaced apart from the processing liquid flow path forming mechanism 62A in the Y-axis direction.

The radiator 74 is configured to radiate the radiation light from the light source 72 toward the processing liquid flow paths 64 of the processing liquid flow path forming mechanisms 62A to 62L. For example, the radiator 74 is configured to radiate the radiation light toward the processing liquid flow paths 64 of the processing liquid flow path forming mechanisms 62A to 62L individually. The radiator 74 may be disposed below the processing liquid flow path 64. The radiator 74 has an optical member 82 configured to radiate the radiation light toward the processing liquid flow paths 64 individually by changing the direction of the radiation light from the light source 72, for example.

The optical member 82 includes, for example, a reflecting member 82*a*, a condensing lens 82*b*, a light attenuation filter 82*c*, and a trap member 82*d*. A reflective surface of the reflecting member 82*a* faces the light source 72 in the Y-axis direction. The reflective surface of the reflecting member 82*a* reflects the radiation light emitted substantially horizontally from the light source 72 upwards. The condensing lens 82*b* is disposed above the reflecting member 82*a*, and focuses the radiation light reflected by the reflecting member 82*a* onto a measurement position set in the processing liquid flow path 64. The condensing lens 82*b* is configured to radiate the radiation light to, for example, a measurement position set in the first flow path 68*a* of the processing liquid flow path 64. In addition, the light-condensing position by the condensing lens 82*b* may be set in consideration of the fact that the path of the radiation light may be changed by the light attenuation filter 82*c* to be described later.

The light attenuation filter 82*c* functions as a light attenuation member configured to attenuate the light emitted from the condensing lens 82*b* and output it toward the processing liquid flow path 64. That is, the light attenuation filter 82*c* serves as a light adjuster that adjusts the amount of the light emitted toward the processing liquid flow path 64. By way of example, an ND (Neutral Density) filter can be used as the light attenuation filter 82*c*. The present embodiment shows an example of using a reflective ND filter as the light attenuation filter 82*c*. In the case of the reflective ND filter, a certain percentage of incident light passes through the ND filter to be emitted toward the processing liquid flow path 64, but some of the light is reflected by the filter. The trap member 82*d* is provided on an optical path of the light reflected by the light attenuation filter 82*c*. A beam trap configured to absorb the radiation light may be used as the trap member 82*d*. The reflective ND filter may be implemented by, for example, a beam splitter.

As shown in FIG. 7, the light attenuation filter 82*c* may be provided for the processing liquid flow path 64 in each of the processing liquid flow path forming mechanisms 62A to 62L individually. As shown in FIG. 5, the plurality of light attenuation filters 82*c* may be fixed to the sidewall 56*a* via a supporting member 82*e*, for example.

In addition, the degree (attenuation rate) to which the light attenuation filter 82*c* attenuates the radiation light may vary depending on, for example, the characteristics of the processing liquid flowing through the processing liquid flow path 64. When adjusting the attenuation rate by the light attenuation filter 82*c*, the attenuation rate may be set to be smaller than the amount of the radiation light emitted from the light attenuation filter 82*c* toward the processing liquid flow path 64 within a range in which foreign substance detection performance does not deteriorate due to the light attenuation. Details of this will be explained later.

Further, although the above description has been provided for the case where the light attenuation filter 82*c* is the ND filter, it may be also possible to use the light attenuation filter 82*c* whose optical characteristics regarding the light attenuation are different from those of the ND filter. For example, a filter having optical characteristics that selectively attenuate light in a specific wavelength range may be used as the light attenuation filter 82*c*. The optical characteristics of the filter to be selected can also be changed within a range in which the light receiver 76 can sufficiently detect the state in which the foreign substance is mixed into the processing liquid.

When the light attenuation filters 82*c* are respectively provided for the processing liquid flow paths 64 of the processing liquid flow path forming mechanisms 62A to 62L, these light attenuation filters 82*c* may have different attenuation rates. When the same type of processing liquids flow through the processing liquid flow paths 64 of the processing liquid flow path forming mechanisms 62A to 62L, the attenuation rates of the light attenuation filters 82*c* corresponding to the respective processing liquid flow paths 64 may be set to be the same. Meanwhile, when different types of processing liquids flow through the processing liquid flow paths 64, it may be possible to provide the light attenuation filters 82*c* having different attenuation rates according to the types of the processing liquids.

In addition, when the light attenuation filters 82*c* are respectively provided for the processing liquid flow paths 64 of the processing liquid flow path forming mechanisms 62A to 62L, these light attenuation filters 82*c* may have optical characteristics, other than the attenuation rates, different from each other. Examples of the optical characteristic other than the attenuation rate may be, by way of example, a polarization characteristic. Further, there may be adopted a configuration in which filters having different light attenuation characteristics depending on the wavelength are used.

The holder 78 is configured to movably hold the individual members (the reflecting member 82*a*, the condensing lens 82*b*, and the trap member 82*d*) of the optical member 82 except the light attenuation filter 82*c*. The holder 78 has a guide rail 88 and a slide table 84, for example. The guide rail 88 may be provided on the bottom wall 54*b*, and may be formed to extend in a direction from the sidewall 56*c* toward the sidewall 56*d* (along the Y-axis direction). For example, the guide rail 88 may extend along the Y-axis direction at least between the processing liquid flow path forming mechanism 62A and the processing liquid flow path forming mechanism 62L, as shown in FIG. 7. The guide rail 88 is configured to support the slide table 84 movably.

The slide table 84 is disposed below the processing liquid flow path forming mechanisms 62A to 62L, and serves to support the optical member 82 (for example, the reflecting member 82*a*). The slide table 84 is formed to extend along a direction (for example, the X-axis direction) intersecting the guide rail 88, as shown in FIG. 5 or FIG. 7, for example. By way of example, when viewed from the side, one end of the slide table 84 close to the sidewall 56*a* is located below the processing liquid flow path forming mechanism 62A, and the other end thereof close to the sidewall 56*b* is located closer to the sidewall 56*b* than the position of the processing liquid flow path forming mechanism 62A. As an example, among the components of the optical member 82, the one held by the holder 78 is disposed at the one end of the slide table 84 close to the sidewall 56*a*.

The driver 80 is configured to move the slide table 84 along the guide rail 88 by a power source such as an electric motor. As the slide table 84 is moved along the guide rail 88, the radiator 74 (the one held by the holder 78 among the components of the optical member 82) is moved along the Y-axis direction.

The light receiver 76 is configured to receive the light emitted from the processing liquid flow path 64 by the radiation of the radiation light from the radiator 74. The light receiver 76 may be disposed such that the processing liquid flow path forming mechanisms 62A to 62L are interposed between the light receiver 76 and the sidewall 56*a*.

The light receiver 76 includes, by way of example, an optical member 92 and a light receiving element 94. In the direction from the sidewall 56*a* to the sidewall 56*b* (X-axis direction), the processing liquid flow path forming mechanism 62A, the optical member 92, and the light receiving element 94 are arranged in this order. Height positions of the optical member 92 and the light receiving element 94 may be substantially the same as the height position of the first flow path 68*a* of the processing liquid flow path 64.

The optical member 92 includes, for example, a condensing lens configured to condense the light emitted from the processing liquid flow path 64 toward the light receiving element 94. Inside the optical member 92, a wavelength filter configured to allow only the light with a specific wavelength to pass therethrough may be provided. The light receiving element 94 is configured to receive the light condensed by the optical member 92, and configured to generate an electrical signal according to the received light (detection light). The light receiving element 94 includes, for example, a photodiode configured to perform photoelectric conversion.

The optical member 92 and the light receiving element 94 are mounted to a supporting member 86 extending along the vertical direction. The supporting member 86 is connected to the slide table 84. For example, a lower end of the supporting member 86 is connected to an end of the slide table 84 opposite to the end where the optical member 82 is provided. As the slide table 84 is moved by the driver 80, the optical member 92 and the light receiving element 94 are moved along the Y-axis direction.

With the above-described configuration, the driver 80 moves the slide table 84 to move both the radiator 74 (the optical member 82 held by the holder 78) and the light receiver 76 along the Y-axis direction. For example, the driver 80 moves the radiator 74 and the light receiver 76 between a position where the radiator 74 and the light receiver 76 face the processing liquid flow path forming mechanism 62A and a position where the radiator 74 and the light receiver 76 face the processing liquid flow path forming mechanism 62L. Hereinafter, a position where the radiator 74 and the light receiver 76 face any one processing liquid flow path forming mechanism is referred to as a position corresponding to the processing liquid flow path forming mechanism.

As an example, as the optical member 82 is moved by the driver 80 to below any one of the processing liquid flow paths of the processing liquid flow path forming mechanisms 62A to 62L in the state that the radiation of the radiation light from the light source 72 to the optical member 82 is continued, the radiation light is radiated from the radiator 74 to the corresponding processing liquid flow path 64. The radiation light radiated to this processing liquid flow path 64 is light that has been attenuated by the light attenuation filter 82*c* provided below the processing liquid flow path 64. When the radiation light is being radiated, the light receiving element 94 receives the light emitted from the processing liquid flow path 64.

As described above, the radiator 74 is disposed below the measurement position set in the processing liquid flow path 64, and the light receiver 76 is disposed at a lateral side of the corresponding measurement position. Accordingly, when the radiation light is radiated to the processing liquid flow path 64, the light receiver 76 receives some of light (scattered light) generated as a result of scattering of the radiation light at the measurement position within the processing liquid flow path 64. When the radiation light is radiated into the processing liquid flow path 64 through which a solution such as a processing liquid flows, scattered light is generated due to the components of the processing liquid, regardless of presence or absence of the foreign substance. When no foreign substance is contained in the solution, most of the radiation light passes through the processing liquid flow path 64. On the other hand, if the foreign substance is contained in the solution, the degree of scattering of the radiation light within the processing liquid flow path 64 increases, so the intensity of the light received by the light receiver 76 (some of the scattered light toward the light receiver 76) increases, as compared to a case where no foreign substance is contained.

In addition, as shown in FIG. 7, the foreign substance detector 50 may further include a heat sink 58. The heat sink 58 may be provided outside the housing 52. For example, the heat sink 58 may be provided, on an outer surface of the bottom wall 54*b*, at a position corresponding to the light source 72. The heat sink 58 may be a water-cooling type heat sink. The heat sink 58 serves to suppress a temperature rise in the housing 52 due to the optical member such as the light source 72. Accordingly, an influence of heat generated from the optical member such as the light source 72 on the processing liquid (substrate processing) is reduced.

The foreign substance detector 50 may further include a controller 100. The controller 100 controls the individual components of the foreign substance detector 50. The controller 100 is disposed inside the housing 52, for example.

Figure 8:
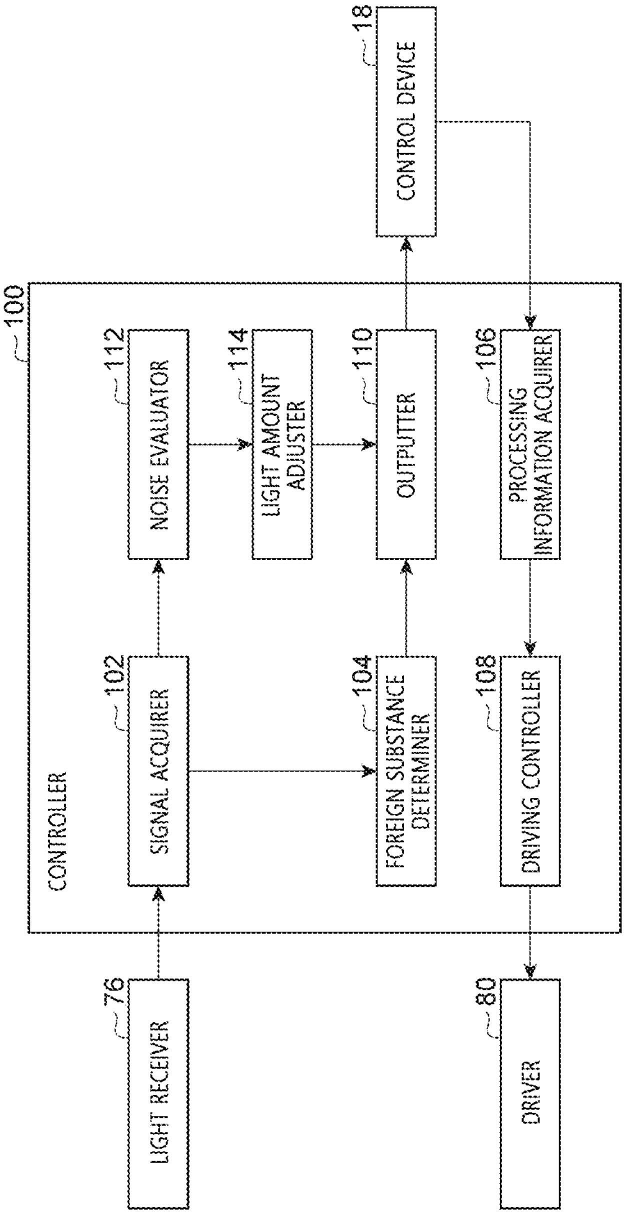
FIG. 8 is a block diagram illustrating an example of a functional configuration of a controller.

As shown in FIG. 8, the controller 100 has, as functional components (hereinafter referred to as "functional modules"), a signal acquirer 102, a foreign substance determiner 104, a processing information acquirer 106, a driving controller 108, and an outputter 110. Further, the controller 100 has a noise evaluator 112 and a light amount adjuster 114. Further, processings performed by the signal acquirer 102, the foreign substance determiner 104, the processing information acquirer 106, the driving controller 108, the outputter 110, the noise evaluator 112, and the light amount adjuster 114 correspond to a processing performed by the controller 100.

The signal acquirer 102 is configured to acquire an electrical signal according to the intensity of the detection light from the light receiver 76. For example, the signal acquirer 102 acquires, from the light receiving element 94, the electrical signal according to the intensity of the light emitted from, among the processing liquid flow path forming mechanisms 62A to 62L, the processing liquid flow path 64 (first flow path 68*a*) through which the processing liquid to be monitored flows. The signal acquirer 102 acquires, for example, an electrical signal having an amplitude according to the intensity of the detection light.

Figure 9:
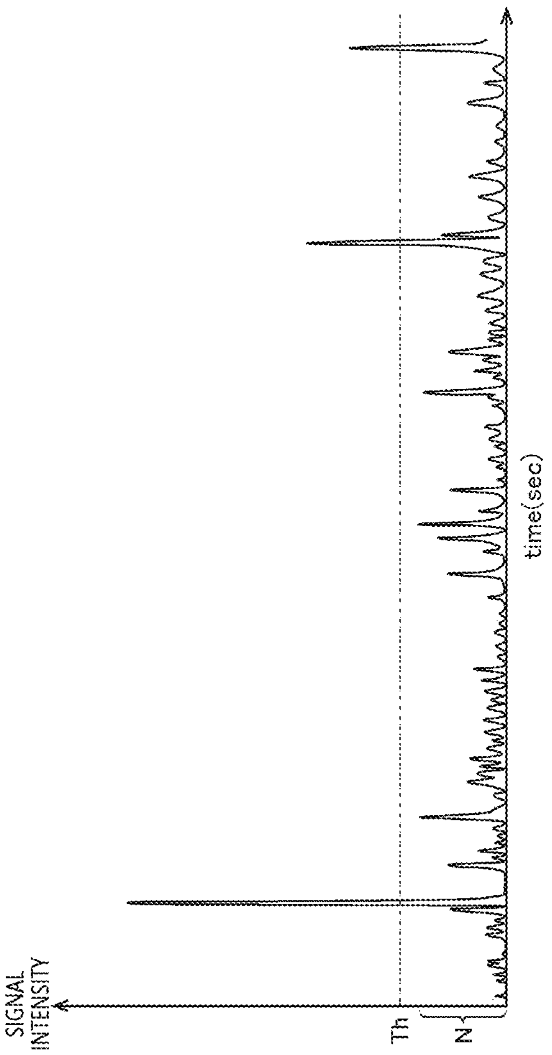
FIG. 9 is a graph illustrating an example of signal intensity according to detection light.

The foreign substance determiner 104 is configured to detect presence or absence of the foreign substance in the processing liquid based on the intensity of the electrical signal (hereinafter referred to as "signal intensity"), such as the amplitude, according to the detection light. FIG. 9 presents a graph showing an example of a variation in the signal intensity over time obtained from the signal acquirer 102. For example, when the signal intensity is larger than a predetermined threshold value Th as shown in FIG. 9, the foreign substance determiner 104 makes a determination that the processing liquid contains the foreign substance. When the signal intensity is less than or equal to the predetermined threshold value Th, on the other hand, the foreign substance determiner 104 makes a determination that the processing liquid does not contain the foreign substance. The threshold value Th is a value set in advance in consideration of the intensity of the scattered light when the radiation light is scattered by the foreign substance in the processing liquid.

The noise evaluator 112 is configured to specify a noise component from the electrical signal according to the intensity of the detection light. Further, the light amount adjuster 114 has a function of adjusting the amount of the light radiated to the processing liquid based on the result of specifying the noise component by the noise evaluator 112.

The adjustment by the noise evaluator 112 and the light amount adjuster 114 will be described with reference to FIG. 9 and FIGS. 10A and 10B. As shown in FIG. 9, the signal intensity obtained from the signal acquirer 102 includes a noise component N that fluctuates below the threshold value Th as well as the intensity that exceeds the threshold value Th. The noise component N may include a device noise and a haze noise. The device noise is a fixed component derived from an electric circuit of the device, etc., and can be a noise of constant intensity regardless of the intensity of the light radiated to the processing liquid flow path 64. Therefore, in the present exemplary embodiment, the device noise may be referred to as a steady noise.

Meanwhile, the haze noise is a component generated due to the component of the processing liquid, etc. As described above, when the radiation light is radiated into the processing liquid flow path 64 through which the solution such as the processing liquid flows, the scattered light is generated due to the component of the processing liquid, regardless of presence or absence of the foreign substance. An electrical signal emitted from the light receiving element 94 when the scattered light derived from the component of the processing liquid is incident on the light receiving element 94 corresponds to the haze noise. Since the haze noise is not an electrical signal indicating the presence of the foreign substance, the threshold value Th for determining the presence or absence of the foreign substance can be set so that the haze noise is not detected as the foreign substance detection result.

Since the scattered light emitted from the processing liquid flow path 64 as a result of radiating the radiation light to the foreign substance and the above-describe haze noise are both the light generated by the radiation light, the signal intensity thereof may vary depending on the intensity of the radiation light. FIG. 10A and FIG. 10B schematically show how the intensity of the electrical signal indicating the signal intensity of each noise and presence of the foreign substance varies when the intensity of the radiation light toward the processing liquid flow path 64 is changed.

Figure 10A:
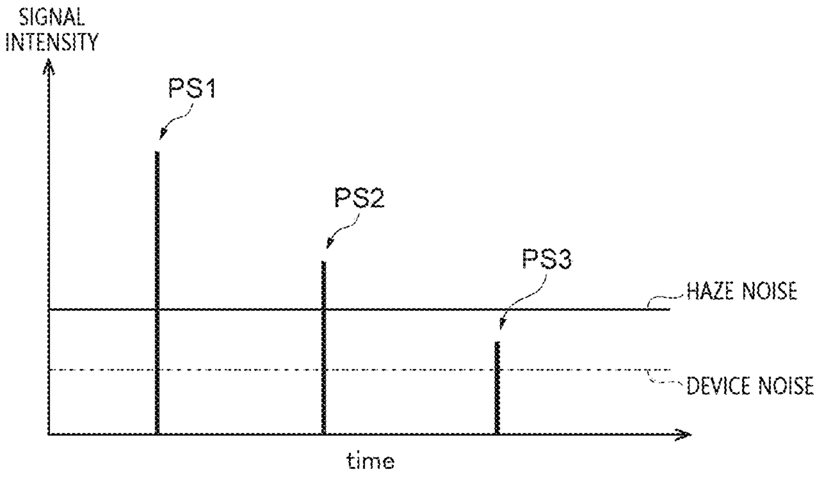
FIG. 10A and FIG. 10B are graphs illustrating an example of a relationship between light intensity variation and detection light.
Figure 10B:
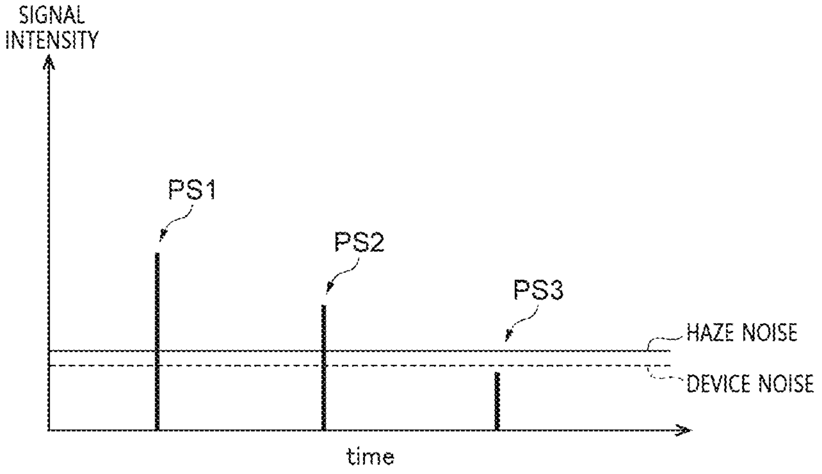
Figure 11:
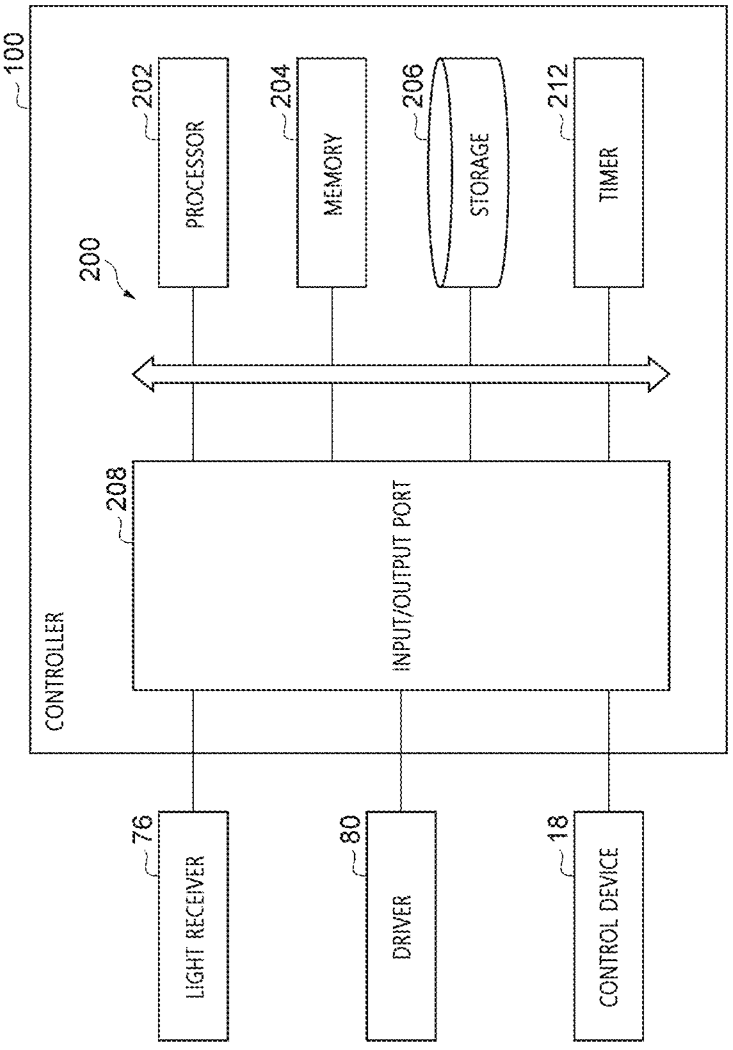
FIG. 11 is a block diagram illustrating a hardware configuration of the controller.

FIG. 10A shows a state in which three signals PS1 to PS3 regarding the foreign substance are detected based on the light from the processing liquid flow path 64. FIG. 10A shows both the device noise and the haze noise. A dashed line indicating the level of the device noise and a solid line indicating the level of the haze noise shown in FIG. 10A shows that noises having amplitudes of such levels can be generated. The example in FIG. 10A shows a situation where the level of the haze noise is high as compared to the level of the device noise. Among the three signals PS1 to PS3, the signal PS3 is buried in the haze noise, so the signal PS3 may not be recognized as a signal originating from the foreign substance but may be recognized as a part of a noise by the foreign substance determiner 104. That is, in the example shown in FIG. 10A, only the signals PS1 and PS2 may be recognized as signals indicating the detection of the foreign substance.

If the intensity of the radiation light radiated to the processing liquid flow path 64 is reduced, the intensity of each of the signals PS1 to PS3 also decreases. FIG. 10B shows how the intensity of the signal detected based on the light from the processing liquid flow path 64 changes when the intensity of the radiation light is reduced. As is apparent from the comparison of FIG. 10A and FIG. 10B, when the intensity of the radiation light is reduced, both the signals PS1 to PS3 and the level of the haze noise decrease. Since, however, the intensity of the scattered light is proportional to the intensity of the radiation light, the intensity of each signal also changes while maintaining such a proportional relationship as the radiation light changes. Therefore, when the radiation light is weakened, the intensity of each signal decreases while the intensity relationship between the signals PS1 to PS3 and the level of the haze noise is roughly maintained, as shown in FIG. 10B. Thus, even if the intensity of the radiation light is reduced until the level of the haze noise becomes approximately equal to the level of the device noise, the signals PS1 and PS2 can be distinguished from the noise components (the haze noise and the device noise), so that detection accuracy can be maintained.

Meanwhile, if the intensity of the radiation light is reduced to the extent that the level of the haze noise becomes smaller than the level of the device noise, the signal PS2 may be mixed with the noise components, and the detection accuracy for the foreign substance may be deteriorated. In this regard, a condition in which the level of the haze noise is approximately equal to the level of the device noise is called a minimum light amount of the radiation light in the state that the detection accuracy is maintained. Then, the light amount is adjusted by the aforementioned light attenuation filter 82*c* or the like so that the radiation light can be radiated to the processing liquid flow path 64 under such a condition.

The noise evaluator 112 and the light amount adjuster 114 described above have a function of adjusting the amount of the light radiated to the processing liquid flow path 64 by using the above-described method. Specifically, the noise evaluator 112 has a function of identifying a haze noise component and a device noise component from a measurement result of the signal intensity that has already been measured. In addition, the light amount adjuster 114 has a function of calculating an attenuable light amount of the radiation light based on the components identified in the noise evaluator 112.

As a method of distinguishing the haze noise component and the device noise component in the noise evaluator 112, there may be adopted a method of using two measurement results obtained under different light amount conditions in the state that the same processing liquid is flowing in the same processing liquid flow path 64. As described above, since the haze noise component is a component that can vary depending on the amount of the radiation light, it can be determined whether the level of the haze noise is higher than the level of the device noise in the noise component N based on whether the noise component N varies depending on the light amount. Further, the light amount adjuster 114 may perform the measurement repeatedly while reducing the amount of the radiation light, and then specify a state in which the variation of the noise component N is reduced as the minimum light amount of the radiation light. Further, a state in which the light amount is slightly increased as compared to the minimum light amount may be set as an appropriate light amount of the radiation light. In this way, the noise evaluator 112 and the light amount adjuster 114 can identify a relationship between the haze noise component and the device noise component, and can set the light amount of the radiation light after being attenuated within a range in which the device noise component does not affect the detection accuracy for the foreign substance.

The result of the adjustment of the light amount by the noise evaluator 112 and the light amount adjuster 114 may be outputted from the outputter 110 to the control device 18. Based on this result of the adjustment of the light amount by the noise evaluator 112 and the light amount adjuster 114, the driving controller 108 may be controlled to adjust the light amount.

The processing information acquirer 106 is configured to acquire information on the processing to be performed in the liquid processing device U1 (hereinafter referred to as "processing information") from the control device 18. The processing information includes, for example, information indicating the nozzle that discharges the processing liquid (a processing liquid to be monitored) in the liquid processing unit U1, and information indicating the supply start time and the supply time of the processing liquid. The processing information acquirer 106 may acquire processing information from the control device 18 for each processing using one processing liquid until the supply start of the processing liquid.

The driving controller 108 moves the slide table 84 by the driver 80 to move the radiator 74 and the light receiver 76 between the processing liquid flow path forming mechanisms 62A to 62L. For example, according to the processing liquid indicated by the processing information, the driving controller 108 moves the radiator 74 and the light receiver 76 by the driver 80 to a position corresponding to, among the processing liquid flow path forming mechanisms 62A to 62L, the processing liquid flow path 68 through which the corresponding processing liquid passes. When the radiation light is not radiated to the processing liquid flow path 64, the driving controller 108 moves the radiator 74 and the light receiver 76 to a predetermined standby position by the driver 80. In one example, the standby position may be set to a position that does not overlap the processing liquid flow path forming mechanisms 62A to 62L.

The driving controller 108 controls the driver 80 such that the radiation light is radiated to the processing liquid flow path 68 during at least a part of a period in which the processing liquid is supplied to the workpiece W. During at least a part of a period in which no processing liquid is supplied to the workpiece W, the driving controller 108 controls the driver 80 such that the radiation light is radiated toward a different position from the processing liquid flow paths 64 of the processing liquid flow path forming mechanisms 62A to 62L at the standby position.

The outputter 110 is configured to output the determination result by the foreign substance determiner 104 to an outside of the foreign substance detector 50. The outputter 110 may output the determination result to the control device 18, or to a display that notifies the determination result to an operator. For example, when it is determined by the foreign substance determiner 104 that the foreign substance is included, the outputter 110 may output an alarm signal indicating that the processing liquid to be monitored contains the foreign substance. Further, the outputter 110 may output the result of the adjustment of the light amount by the noise evaluator 112 and the light amount adjuster 114 to the control device 18.

The controller 100 is composed of one or more control computers. By way of example, the controller 100 has a circuit 200 shown in FIG. 11. The circuit 200 has one or more processors 202, a memory 204, a storage 206, an input/output port 208, and a timer 212. The storage 206 has a computer-readable recording medium such as, but not limited to, a hard disk. The recording medium stores therein a program for causing the controller 100 to perform an operation confirmation method to described later. The recording medium may be a removable medium such as a non-volatile semiconductor memory, a magnetic disk, or an optical disk. The memory 204 temporarily stores the program loaded from the recording medium of the storage 206 and an operation result by the processor 202.

The processor 202 executes the program in cooperation with the memory 204, thereby embodying the individual functional modules. The input/output port 208 performs an input/output of an electrical signal between the control device 18, the light receiver 76, the driver 80, and so forth in response to an instruction from the processor 202. The timer 212 measures an elapsed time by counting, for example, a reference pulse of a certain period. Additionally, the hardware configuration of the controller 100 is not necessarily limited to embodying each functional module by the program. For example, each of the functional modules of the control device 18 may be implemented by a dedicated logic circuit or an ASIC (Application Specific Integrated Circuit) integrating logic circuits.

[Foreign Substance Detection Method]

Figure 12:
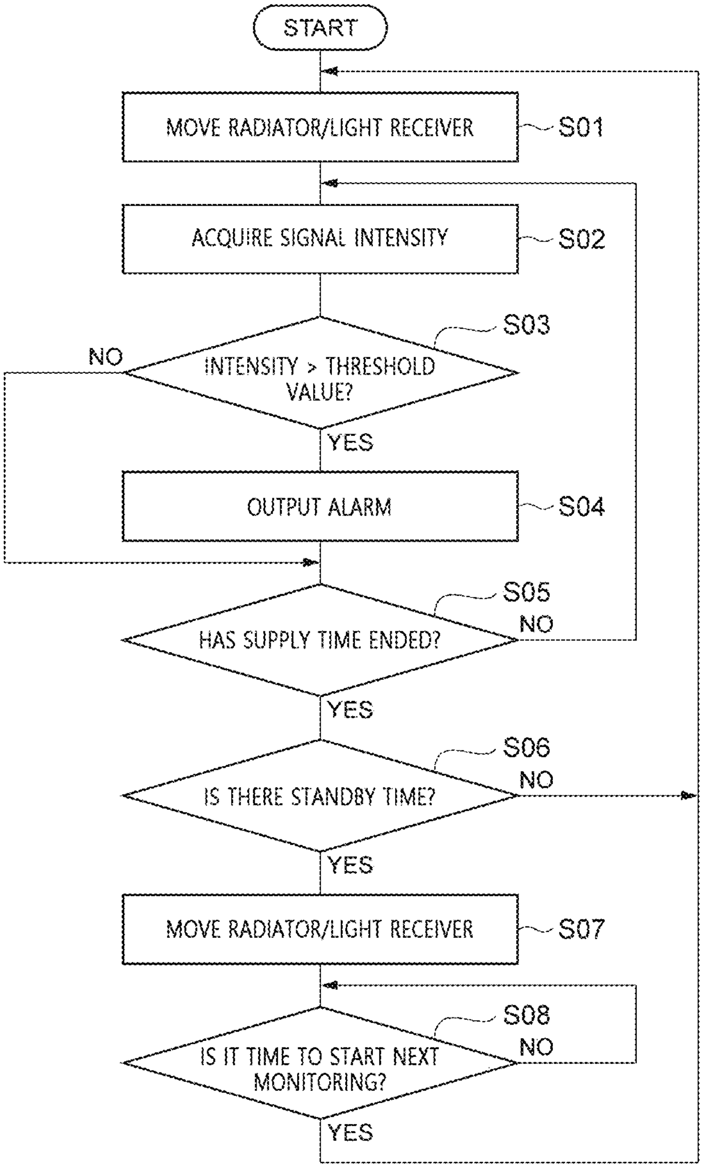
FIG. 12 is a flowchart illustrating an example of a foreign substance detection method.

Now, with reference to FIG. 12, a foreign substance detection method (foreign substance detection procedure) performed in the foreign substance detector 50 will be described. FIG. 12 is a flowchart illustrating an example of the foreign substance detection method.

For example, if the processing information acquirer 106 acquires the processing information from the control device 18 while the radiation of the radiation light from the light source 72 is being carried on, the controller 100 performs a process S01. For example, in the process S01, the driving controller 108 moves the slide table 84 by the driver 80 to move the radiator 74 and the light receiver 76 to the position corresponding to the processing liquid flow path 64 in which the processing liquid to be monitored indicated by the processing information flows. Accordingly, the radiation light from the radiator 74 is radiated to the processing liquid flow path 64 in which the processing liquid to be monitored flows, and the light emitted from this processing liquid flow path 64 is received by the light receiver 76.

Next, the controller 100 performs processes S02 and S03. For example, in the process S02, the signal acquirer 102 acquires the signal intensity according to the detection light received by the light 76. For example, in the process S03, the foreign substance determiner 104 determines whether the signal intensity obtained in the process S02 is larger than the threshold vale Th. If it is determined in the process S03 that the signal intensity is larger than the threshold value Th (process S03: YES), the controller 100 performs a process S04. For example, in the process S04, the outputter 110 outputs the alarm signal indicating that the processing liquid to be monitored contains the foreign substance. Meanwhile, if it is determined in the process S03 that the signal intensity is below the threshold value Th (process S03: NO), the controller 100 does not perform the process S04.

Next, the controller 100 performs a process S05. For example, in the process S05, the controller 100 determines whether the supply of the processing liquid to be monitored has been ended. The controller 100 may determine whether the supply of the processing liquid has been ended by measuring an elapsed time from the supply start time included in the processing information. If it is determined in the process S05 that the supply of the processing liquid to be monitored has not been ended (process S05: NO), the controller 100 repeats the processing of the processes S02 and S03. Accordingly, throughout the period during which the processing liquid is supplied, monitoring of whether or not the processing liquid contains the foreign substance is continued.

When it is determined in the process S05 that the supply of the processing liquid to be monitored has been ended (process S05: YES), the controller 100 performs a process S06. For example, in the process S06, the controller 100 checks presence or absence of the standby time based on a supply start time for a processing liquid to be monitored next (hereinafter referred to as "next supply start time"). As an example, when the time until the next supply start time is longer than a predetermined time, it is determined that the standby time exists, so the controller 100 performs a process S07. For example, in the process S07, the driving controller 108 moves the radiator 74 and the light receiver 76 to the standby position by the driver 80.

Next, the controller 100 a performs S08. For example, in the process S08, the controller 100 stands by until it is time to start monitoring of the processing liquid to be monitored next. For example, the controller 100 stands by until the time until the next supply start time becomes shorter than the predetermined time. In the process S08, when it is time to start monitoring of the processing liquid to be monitored next (process S08: YES), or when it is determined in the process S06 that there exists no standby time (process S06: NO), the controller 100 repeats the processing of the processes S01 to S06.

[Adjusting Method of Light Amount]

Figure 13:
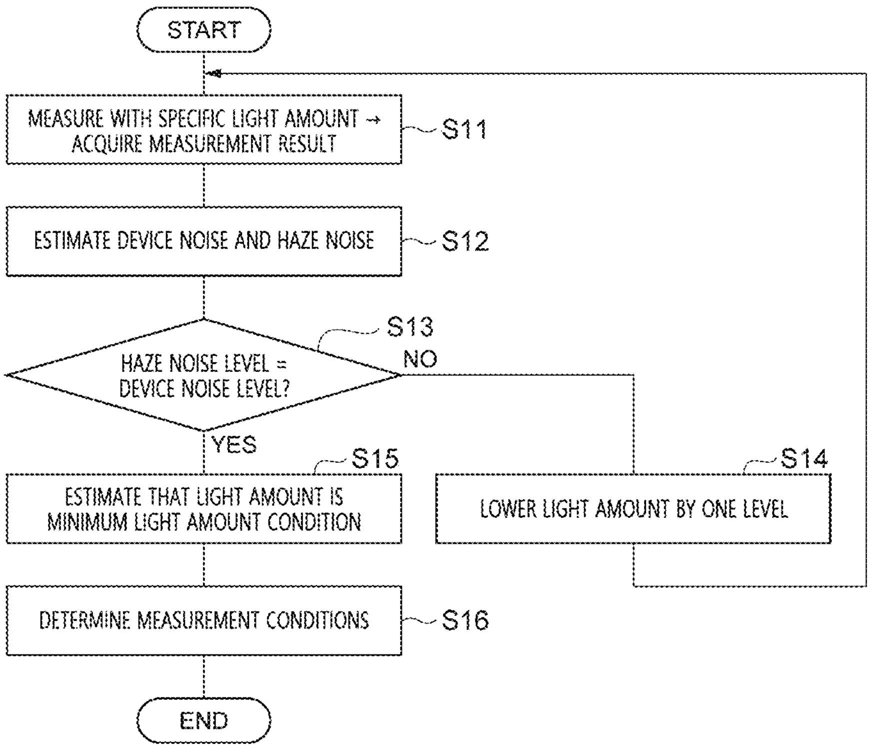
FIG. 13 is a flowchart illustrating an example of a method of adjusting light intensity for use in the foreign substance detection method.

Now, with reference to FIG. 13, an adjusting method of a light amount performed in the foreign substance detector 50 will be described. FIG. 13 is a flowchart showing an example of the adjusting method of the light amount.

First, the controller 100 performs a process S11. For example, in the process S11, the driving controller 108 moves the slide table 84 by the driver 80 to locate the radiator 74 and the light receiver 76 at the position corresponding to the processing liquid flow path 64 through which the processing liquid to be monitored indicated by the processing information flows. Accordingly, the radiation light is radiated from the radiator 74 to the processing liquid flow path 64 through which the processing liquid to be monitored flows, and the light emitted from this processing liquid flow path 64 is received by the light receiver 76. Then, the signal acquirer 102 acquires the signal intensity according to the detection light received by the light receiver 76. The measurement result obtained in this way is a measurement result matched with a specific light amount. When necessary, the controller 100 may repeat the process S11 to obtain measurement results under multiple conditions with different light amounts.

Then, the controller 100 performs a process S12. For example, in the process S12, the noise evaluator 112 identifies the device noise component and the haze noise component from the signal intensity information obtained in the process S11. As an example, as described above, the level of the haze noise component may be specified based on whether there is a difference in the level of the noise component N between measurement results under measurement conditions with two levels of light amounts. Additionally, in the process S12, the device noise component and the haze noise component may not be clearly distinguished. As an example, in the process S12, it may be only specified how large the noise component N is. Further, when the magnitude of the device noise component is known, if the noise component N is larger than the magnitude of the device noise component, it indicates that the haze noise component is larger than the device noise component. The haze noise component may be estimated from this information. The noise component N can also be directly measured from a result when the light amount is set to zero.

Next, the controller 100 performs a process S13. For example, in the process S13, the light amount adjuster 114 determines whether the device noise level and the haze noise level are approximately the same in the measurement result for the specific light amount. While the device noise level is constant, the haze noise level varies depending on the light amount. Therefore, it may be determined whether the device noise level and the haze noise level are approximately the same based on whether the level of the noise component N changes when the light amount is changed (reduced).

When the haze noise level is high relative to the device noise level (process S13: NO), it is determined that there is a room for reducing the haze noise level. In this case, in the process S14, the light amount of the radiation light to be radiated to the processing liquid flow path 64 may be set to be one level lower by the light amount adjuster 114 of the controller 100, for example. Further, the above-described the processes S11 to S13 may be repeated under the condition that the light amount is lowered by one level.

When the haze noise level is equal to the device noise level (process S13: YES), it is determined that there is no room for reducing the haze noise level. In this case, in a process S15, the light amount adjuster 114 of the controller 100 may make an estimation that the light amount of the radiation light radiated to the processing liquid flow path 64 is a minimum condition, for example. Further, in a process S16, a condition in which the light amount is slightly increased from this minimum condition may be set as a measurement condition in the light amount adjuster 114, for example. Here, the measurement condition refers to a light amount when detecting the foreign substance in the processing liquid. The minimum light amount condition may be adopted as the measurement condition, or in consideration of a slight change in the light amount, or the like, a state in which the light amount is slightly increased from the minimum condition may be adopted.

Additionally, the procedure regarding the adjustment of the light amount shown in FIG. 13 can be performed for each processing liquid, for example. Since a component in the processing liquid changes as the processing liquid changes, the level of the haze noise may also vary. Furthermore, the light amount may be adjusted for each processing liquid flow path 64. For example, since the level of the haze noise is likely to change when the processing liquid flow path 64 is changed, the adjustment of the light amount can be carried out in further detail by performing the above procedure for each processing liquid flow path 64.

[Another Configuration Example of Light Attenuation Member]

Figure 14:
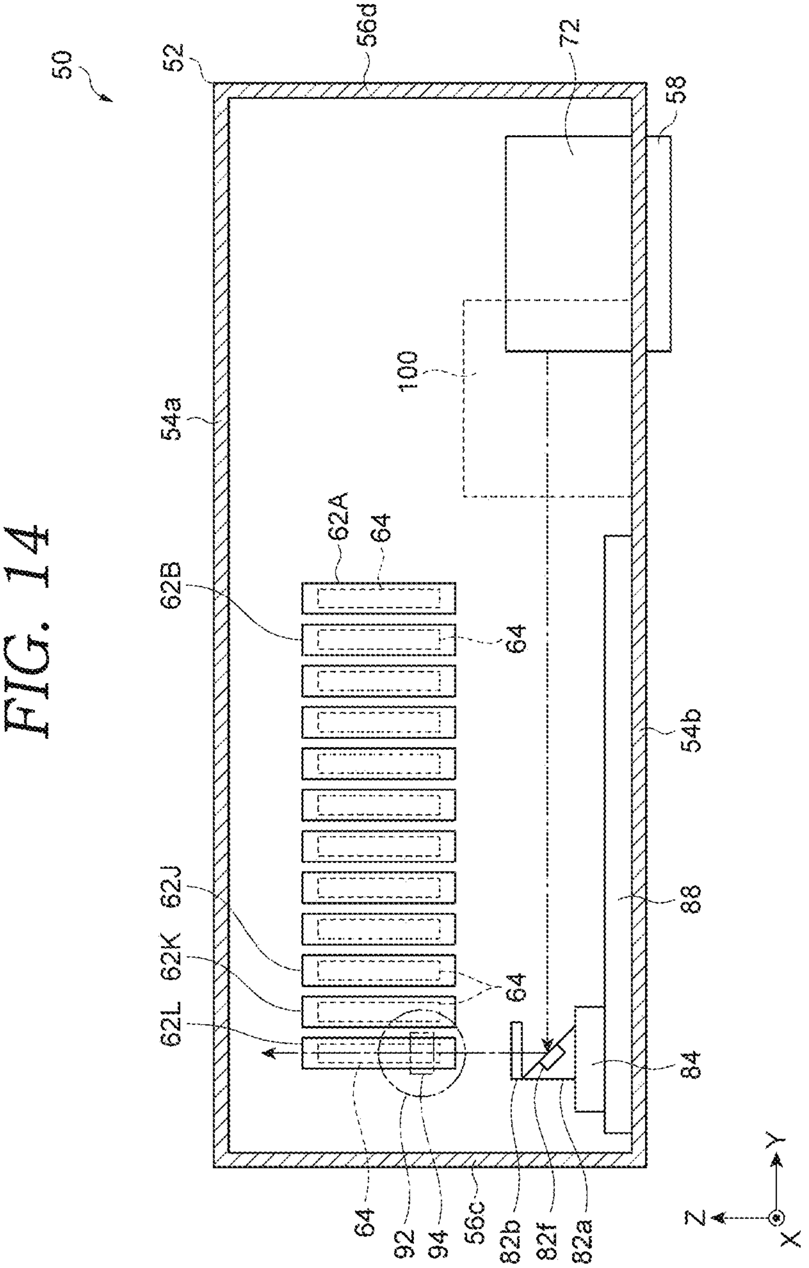
FIG. 14 is a side view schematically illustrating another example of a foreign substance detection module.

FIG. 14 is a diagram showing another example of the light attenuation member that serves as the light adjuster. FIG. 14 illustrates an example in which a beam splitter **82*f*, which serves as the light attenuation member, is provided on an optical path instead of the reflecting member 82*a*. In this case, a part of the light split by the beam splitter 82*f* is emitted toward the processing liquid flow path 64. Further, the other part of the light split by the beam splitter 82*f* (that is, the light heading toward a different direction from the processing liquid flow path 64) may be absorbed in a non-illustrated trap member. In the configuration shown in FIG. 14, like other members included in the radiator 74, the beam splitter 82*f* is also held by the holder 78, and is moved in the Y-axis direction as the slide table 84 is moved along the guide rail 88**.

In this way, the configuration and the layout of the light attenuation member can be appropriately modified. Further, as another configuration example regarding the light attenuation member, a configuration in which the light attenuation member is disposed between the light source 72 and the reflecting member **82*a*** may be adopted. In addition, it may be also possible to adopt a configuration in which any one of a plurality of light attenuation members having different optical characteristics can be selected and disposed on the optical path. At this time, there may be adopted a configuration in which the plurality of light attenuation members are provided in a revolver and any one of the light attenuation members is disposed on the optical path by rotating the revolver. Additionally, it may be also possible to adopt a configuration in which a plurality of light attenuation members are disposed on the optical path and the radiation light is optimized by the plurality of light attenuation members.

Moreover, the light source 72 itself may be configured to have a light adjustment function. As an example, the intensity of the light emitted from the light source 72 may be adjusted. The foreign substance detector 50 can be provided with the above-described various configurations regarding the light attenuation member, and these various configurations may be combined to adjust the amount of the light radiated to the processing liquid flow path 64.

Effects

According to the above-described foreign substance detection device and foreign substance detection method, the light emitted from the light source 72 is radiated to the processing liquid flow path 64 after the light amount thereof is adjusted by the light attenuation filter 82*c* (or the beam splitter 82*f*) functioning as the light adjuster included in the radiator 74. The amount of the light radiated to the plurality of processing liquid flow paths 64 can be adjusted. Therefore, when the processing liquids with different characteristics flow through the plurality of processing liquid flow paths, or when the flow conditions such as a flow speed and a flow rate are different, the amount of the light radiated to the plurality of processing liquid flow paths can be adjusted, which enables the efficient detection of the foreign substance according to the state of the processing liquid in each processing liquid flow path 64.

The radiator 74 may be configured to be moved relative to the plurality of processing liquid flow paths 64 to radiate the radiation light toward each of the plurality of processing liquid flow paths 64. Further, the light adjuster may be provided on the optical path toward each of the plurality of processing liquid flow paths 64. In this case, since it becomes possible to individually adjust the light amount for each of the processing liquid flow paths, the adjustment of the light amount can be carried out in a flexible manner.

The light adjuster may be configured to adjust the light amount of the radiation light based on the noise component included in the light received by the light receiver 76 when the radiation light is radiated to one of the plurality of processing liquid flow paths 64. Specifically, under the condition that the intensity of the haze noise component, which fluctuates according to the intensity of the radiation light, does not fall below the intensity of the steady noise component that occurs regardless of the intensity of the radiation light, the light amount of the radiation light radiated to the processing liquid flow path 64 may be adjusted such that the intensity of the haze noise component becomes close to the intensity of the steady noise component. Among the noise components included in the light received by the light receiver 76, the haze noise component is the component that fluctuates according to the intensity of the radiation light. For this reason, by adjusting the intensity of the radiation light to be close to the intensity of the steady noise component, the intensity of the radiation light can be adjusted to be small while suppressing the decrease in precision of the foreign substance detection. Therefore, the foreign substance detection can be efficiently carried out according to the state of the processing liquid.

There may be further provided the controller 100 configured to acquire the electrical signal according to the intensity of the light received by the light receiver 76. At this time, the controller 100 may estimate the intensity of the steady noise component and the intensity of the haze noise component based on the electrical signal corresponding to the light received by light receiver 76 when the radiation light is radiated to any one processing liquid flow path 64. Furthermore, based on the estimation result in the controller 100, the light amount of the radiation light radiated to the one processing liquid flow path 64 may be adjusted such that the intensity of the haze noise component, which fluctuates according to the intensity of the radiation light becomes close to the intensity of the steady noise. With the above-described configuration, the intensity of the steady noise component and the intensity of the haze noise component are estimated based on the electrical signal corresponding to the light received by the light receiver 76, and the light amount of the radiation light is adjusted based on this estimation result. Therefore, the intensity of the radiation light can be adjusted with higher precision.

The controller 100 may be configured to estimate the intensity of the steady noise component and the intensity of the haze noise component from the electrical signal corresponding to the light received by the light receiver 76 when the radiation lights of different light amounts are radiated to one processing liquid flow path 64. The intensity of the haze noise component may fluctuate according to the intensity of the radiation light. For this reason, by adopting the configuration in which the intensity of the steady noise component and the intensity of the haze noise component are estimated based on the difference in the light received by the light receiver 76 when the different amounts of the radiation light are radiated, it becomes possible to estimate the relationship between the haze noise component and the steady noise component more accurately.

MODIFICATION EXAMPLES

So far, the various exemplary embodiments have been described. However, the present disclosure is not limited to the above-described exemplary embodiments, and various omissions, replacements and modifications may be made. Further, by combining the components in the various exemplary embodiments, other exemplary embodiments may be conceived.

The procedure of the foreign substance detection according to the above-described exemplary embodiments is nothing more than an example, and the order of the processes, timing for performing the processes, and the content of the processes can be modified appropriately.

Further, the configuration of the foreign substance detection device can also be modified appropriately. By way of example, at least some of the processing liquid flow paths 64 flowing in the block body 66 may be formed to extend in directions other than the horizontal direction and the vertical directions. The inlet 64*a* and outlet 64*b* of the processing liquid flow path 64 may be formed at different sides of the block body.

Each of the processing liquid flow path forming mechanisms 62A to 62L may include, instead of the block body 66, a liquid flow pipe for the supply through which the processing liquid flows. The processing liquid flow path 64 may be a flow path within the liquid flow pipe. These liquid flow pipes may be formed of a material capable of transmitting the radiation light (for example, quartz or sapphire). The foreign substance detector 50 may have a single processing liquid flow path forming mechanism instead of the processing liquid flow path forming mechanisms 62A to 62L.

The processing liquid flow path forming mechanisms 62A to 62L may be arranged along the Y-axis direction at an approximately same distance therebetween, or may be arranged at different distances from each other. Further, as a part of the processing liquid flow path forming mechanisms, one or more dummy flow path forming members that are not used for the processing may be disposed.

The optical characteristics of the light attenuation filter 82*c* may be selected according to the characteristics of the processing liquid as described above. For example, a dummy filter, that is, an optical filter without the light attenuation function may be disposed on the optical path up to the processing liquid flow path 64. By way of example, there may be a case where it is not necessary to provide the light attenuation member, such as when the processing liquid is thinner. In this case, if the light attenuation member is not provided for the plurality of processing liquid flow paths 64, there is a likelihood that the processing liquid flow paths may have different optical path lengths. As a resolution, by arranging the optical filter that does not have the light attenuation function on the optical path, like in the other processing liquid flow paths 64, the optical path lengths can be made equal.

The foreign substance detector 50 may include a radiation driver configured to move the radiator 74 along the Y-axis direction, and a light reception driver configured to move the light receiver 76 along the Y-axis direction. These two drivers may be configured to move the radiator 74 and the light receiver 76 along the Y-axis direction, respectively. Also, an X-axis direction driver configured to move the light receiver 76 along the X-axis direction may be provided. The radiator 74 may include the light source 72, so the radiation light may be radiated to each processing liquid flow path 64 without via the optical member 82.

The light receiver 76 may receive a part of transmission light obtained when the radiation light from the radiator 74 passes through the processing liquid flow path 64. In this case, the radiator 74 and the light receiver 76 may be arranged with the processing liquid flow path forming mechanisms 62A to 62L therebetween in the vertical direction (Z-axis direction).

In addition, the specific configuration of the substrate processing apparatus is not limited to the configuration of the coating and developing apparatus 2 illustrated above. The substrate processing apparatus is not particularly limited as long as it is equipped with the foreign substance detector 50 that detects the foreign substance in the processing liquid supplied to the substrate. The processing liquid as the target liquid to be subjected to the foreign substance detection by the foreign substance detector may be a solution for forming a film (for example, the aforementioned bottom film or top film) other than the resist film, or may be a solution for a substrate processing other than the film formation. All or a part of the functional modules included in the controller 100 of the foreign substance detector 50 may be implemented by the control device 18. In this case, the foreign substance detection device may be composed of the foreign substance detector and the control device 18.

From the above description, it will be understood that the various exemplary embodiments of the present disclosure are described herein for illustrative purposes, and that various modifications can be made without departing from the scope and spirit of the present disclosure. Accordingly, the various exemplary embodiments disclosed in this specification are not intended to be anyway limiting, and the true scope and spirit of the present disclosure are indicated by the appended claims.

According to the exemplary embodiment, it is possible to provide the technique capable of detecting the foreign substance efficiently depending on the state of the target liquid.

We claim:

1. A foreign substance detection device configured to detect a foreign substance contained in a processing liquid configured to process a substrate, the foreign substance detection device comprising:

a plurality of block bodies in which respective processing liquid flow paths are formed, through which the processing liquid to be supplied to the substrate flows;

a radiator configured to radiate radiation light from a light source toward each of the multiple processing liquid flow paths; and a light receiver configured to receive light emitted from the processing liquid flow paths by radiating the radiation light, wherein the radiator comprises a light adjuster configured to adjust a light amount of the radiation light radiated to the multiple processing liquid flow paths, and wherein, under a condition that an intensity of a haze noise component, which fluctuates according to an intensity of the radiation light, does not fall below an intensity of a steady noise component that occurs regardless of the intensity of the radiation light, among noise components included in light received by the light receiver when the radiation light is radiated to one of the multiple processing liquid flow paths, the light adjuster adjusts the light amount of the radiation light to be radiated to the one processing liquid flow path such that the intensity of the haze noise component becomes close to the intensity of the steady noise component.

2. The foreign substance detection device of claim 1, wherein the radiator is moved relative to the multiple processing liquid flow paths to radiate the radiation light toward each of the multiple processing liquid flow paths, and the light adjuster is provided on an optical path toward each of the multiple processing liquid flow paths.

3. The foreign substance detection device of claim 1, further comprising:

a controller configured to acquire an electric signal according to the intensity of the light received by the light receiver, wherein the controller estimates the intensity of the steady noise component and the intensity of the haze noise component based on the electric signal corresponding to the light received by the light receiver when the radiation light is radiated to the one processing liquid flow path, and the light adjuster adjusts the light amount of the radiation light to be radiated to the one processing liquid flow path based on an estimation result in the controller such that the intensity of the haze noise component, which fluctuates according to the intensity of the radiation light, becomes close to the intensity of the steady noise component.

4. The foreign substance detection device of claim 3, wherein the controller estimates the intensity of the steady noise component and the intensity of the haze noise component from the electric signal corresponding to the light received by the light receiver when different light amounts of the radiation light are radiated to the one processing liquid flow path.

5. A foreign substance detection method in a foreign substance detection device configured to detect a foreign substance contained in a processing liquid configured to process a substrate, the foreign substance detection method comprising:

radiating, by a radiator, radiation light from a light source toward multiple processing liquid flow paths through which the processing liquid to be supplied to the substrate flows;

receiving, by a light receiver, light emitted from the processing liquid flow paths by radiating the radiation light;

adjusting a light amount of the radiation light to be radiated to the multiple processing liquid flow paths such that, among noise components included in light received by the light receiver when the radiation light is radiated to one of the multiple processing liquid flow paths, an intensity of a haze noise component that fluctuates according to an intensity of the radiation light approaches an intensity of a steady noise component that occurs regardless of the intensity of the radiation light, under a condition that the intensity of the haze noise component does not fall below the intensity of the steady noise component, wherein the radiator varies, by a light adjuster, the light amount of the radiation light to be radiated to the multiple processing liquid flow paths.

6. A foreign substance detection device configured to detect a foreign substance contained in a processing liquid configured to process a substrate, the foreign substance detection device comprising:

a radiator configured to radiate radiation light from a light source toward a processing liquid flow path; and a light receiver configured to receive light emitted from the processing liquid flow path by radiating the radiation light, wherein the radiator comprises a light adjuster configured to adjust a light amount of the radiation light radiated to the processing liquid flow path, and wherein, under a condition that an intensity of a haze noise component, which fluctuates according to an intensity of the radiation light, does not fall below an intensity of a steady noise component that occurs regardless of the intensity of the radiation light, among noise components included in light received by the light receiver when the radiation light is radiated to the processing liquid flow path, the light adjuster adjusts the light amount of the radiation light to be radiated to the processing liquid flow path such that the intensity of the haze noise component becomes close to the intensity of the steady noise component.

* * * * *